United States Patent [19]
Mizuno et al.

[11] 4,212,472
[45] Jul. 15, 1980

[54] SEAL ASSEMBLY FOR ROTARY HEAT-EXCHANGER

[75] Inventors: Toru Mizuno, Kariya; Masao Kitano, Numazu, both of Japan

[73] Assignees: Nippondenso Co., Ltd., Kariya; Toyota Jidosha Kogyo Kabushiki Kaisha, Toyota, both of Japan

[21] Appl. No.: 911,195

[22] Filed: May 30, 1978

[51] Int. Cl.² ............................................. F16J 15/54
[52] U.S. Cl. ................................. 277/12; 277/184; 277/DIG. 6; 165/9
[58] Field of Search ................. 165/9; 277/81 R, 85, 277/88–90, 106, 96 R, 152, 96.1, DIG. 6, 96.2, 184, 102, 113, 232, 182

[56] References Cited

U.S. PATENT DOCUMENTS

| | | | |
|---|---|---|---|
| 2,872,229 | 2/1959 | Waser | 277/184 X |
| 3,341,212 | 9/1967 | Bagnard et al. | 277/152 X |
| 3,601,414 | 8/1971 | Rao | 165/9 X |
| 3,633,926 | 1/1972 | Hryniszak et al. | 165/9 X |
| 3,719,226 | 3/1973 | Vallance | 277/96 X |
| 3,913,926 | 10/1975 | Rao | 165/9 X |
| 3,939,903 | 2/1976 | Sakaki et al. | 165/9 |
| 3,977,465 | 8/1976 | Tank | 165/9 |
| 4,058,158 | 11/1977 | Blom et al. | 165/9 |
| 4,098,323 | 7/1978 | Wiegard et al. | 277/96 X |

FOREIGN PATENT DOCUMENTS

| | | | |
|---|---|---|---|
| 2451247 | 5/1976 | Fed. Rep. of Germany | 165/9 |
| 585898 | 2/1947 | United Kingdom | 277/152 |
| 1383928 | 2/1975 | United Kingdom | 165/9 |
| 1397889 | 6/1975 | United Kingdom | 165/9 |

*Primary Examiner*—Robert S. Ward, Jr.
*Attorney, Agent, or Firm*—Cushman, Darby & Cushman

[57] ABSTRACT

A seal assembly for a rotary heat-exchanger of a gas turbine is held in bearing contact with each end face of a regenerative rotor of the heat-exchanger to slidably support the regenerative rotor and to seal between a low-pressure gas passage and a high-pressure air passage of the turbine. The regenerative rotor is rotated across the passages to effect the heat-exchange between the low-pressure gas and the high-pressure air. The seal assembly comprises a sliding pad formed of a solid lubricant for sliding and bearing contact with the rotor, and a metallic backing for reinforcing the sliding pad.

12 Claims, 5 Drawing Figures

SEAL ASSEMBLY FOR ROTARY HEAT-EXCHANGER

BACKGROUND OF THE INVENTION

Field of the Invention

This invention relates to a seal assembly for a rotary heat-exchanger for use with a gas turbine engine or the like.

Figure 1:
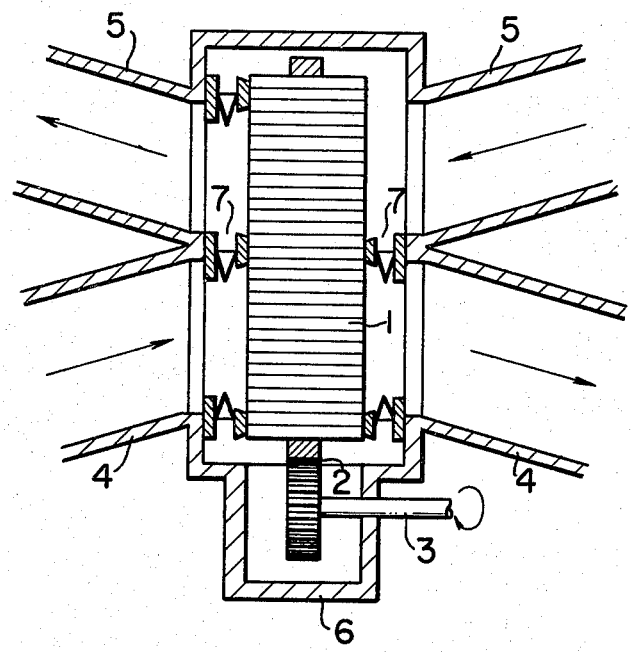
FIG. 1 is a schematic sectional view of a conventional rotary heat-exchanger.
Figure 2:
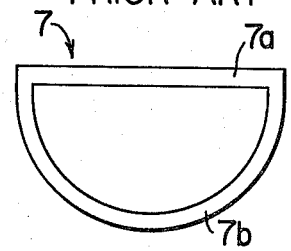
FIG. 2 is an enlarged side view of one of the seal devices shown in FIG. 1.

DESCRIPTION OF THE PRIOR ART (FIGS. 1 and 2)

Before proceeding to the description of the present invention, the disadvantages of the prior art will be considered below with reference to FIGS. 1 and 2.

FIG. 1 schematically represents an ordinary rotary heat-exchanger which comprises a regenerative rotor 1 and a housing 6 therefor. The regenerative rotor 1 includes a matrix and is rotated across a low-pressure gas passage 4 and a high-pressure air passage 5, through a reduction gear 2 and a shaft 3 which is operatively connected to the drive shaft of a turbine not shown, to perform the heat-exchange between the low-pressure, high-temperature gas and a high-pressure, low-temperature air.

For the rotary heat-exchanger, seal devices 7 which completely seal the high-pressure air and low-pressure gas flows within the casing 6 and slidably support the end faces of the rotor 1 therein are essential component parts for the improvement in performance of the heat-exchanger.

Conventional seal devices 7 known in the art comprises a seal element consisting of either a several-millimeter-thick metal plate spray-coated with a solid lubricant as a sliding surface material or a sliding pad formed solely of a solid lubricant, the element of whichever type being pressed slidingly against the regenerative rotor 1 by the force of a spring or bellows.

The seal element consisting of a lubricant-coated metal plate requires the plate as thick as several millimeters to resist thermal strain due to the spray coating. The element formed of a solid lubricant only must be thick, too, for the strength reason. Such a thickened seal element adds to the rigidity of the seal device, impairing its sealing capacity. Moreover, the thickness problem puts a limitation to the choice of the materials for the manufacture of the seal device. Consequently, it has hitherto been impossible to obtain seal devices of quite desirable sealing and sliding properties.

FIG. 2 diagrammatically shows the seal device 7 as viewed from one side of FIG. 1. The straight portion 7a of the seal device during the rotor operation is heated to a higher temperature than the semicircular portion 7a. As a result, the two portions expand differently by up to about several millimeters relative to each other, thus causing deformation of the sliding surface material of the semicircular portion 7b. In an attempt to decrease this deformation the strip of the sliding surface material is narrowed down. However, the surface material must be kept in bearing contact with the regenerative rotor 1 with a pressure high enough to obtain an adequate effect. The narrow strip of the surface material, therefore, has short service life.

The present invention has been perfected with the foregoing in view. It aims at obtaining at low cost a seal assembly with desirable sealability and sliding properties, by stiffening a sliding pad formed of a solid lubricant with a sheet metal backing.

According to this invention, there is provided a seal assembly for a rotary heat-exchanger of a gas turbine, the seal assembly being in bearing contact with each end face of a regenerative rotor of the heat-exchanger to slidably support the regenerative rotor and to seal between a low-pressure gas in a low-pressure gas passage and a high-pressure air in a high-pressure air passage of the turbine, the regenerative rotor being rotated across the passages to effect the heat-exchange between the low-pressure gas and the high-pressure air, the seal assembly comprising a sliding pad formed of a solid lubricant for direct contact with said rotor, and a metallic backing for stiffening the pad.

DETAILED DESCRIPTION OF PREFERRED EMBODIMENTS (FIGS. 3-5)

Figure 3:
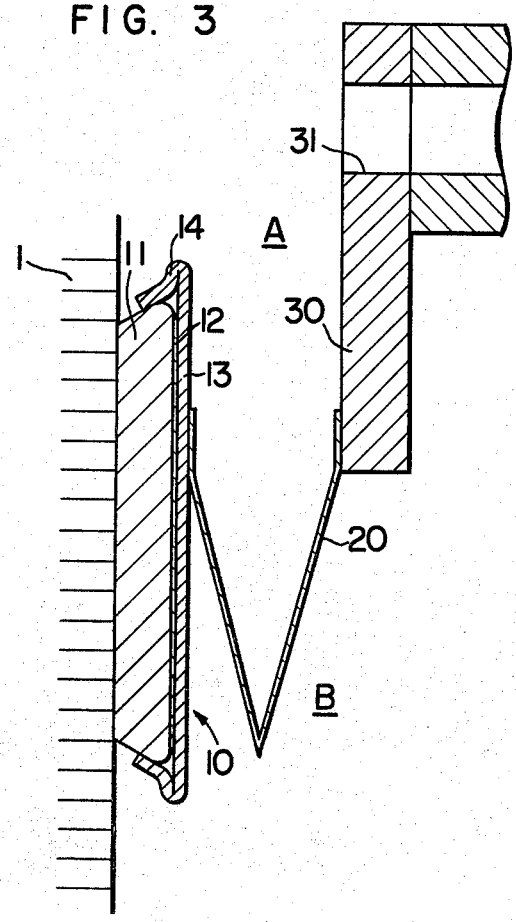
FIG. 3 is a sectional side view of a seal device having a seal assembly embodying the invention.

Referring to FIG. 3, there are shown a disk-like regenerative rotor 1 packed with a matrix as an intermediate heat transfer medium and seal devices slidably supporting the rotor 1 within a housing 6. Each seal device includes a seal assembly 10 according to this invention, and a bellows 20 welded at one end to the seal assembly 10 to press the latter slidably against one end face of the regenerative rotor 1. A flange 30 having bolt holes 31 is welded to the other end of the bellows 20. The whole seal device is fixed to the housing 6 by bolts that pass through the holes 31.

The seal assembly 10 will now be explained in detail. The seal assembly 10 comprises a sliding pad 11 formed of a solid lubricant, a gasket 12, and a backing 13 of a metal sheet, cripped or swaged at both edges 14 to hold the sliding pad 11 and the gasket 12 together. The sliding pad 11 for use on the high-temperature fluid side is made of a ceramic type solid lubricant, and the pad for the low-temperature fluid is of carbon graphite.

The seal assembly of the construction described above operates in the following manner. One side of the bellows 20 is subjected to the pressure of a high-pressure fluid A and the other side, to the pressure of a low-pressure fluid B, and this difference in pressure forces the seal assembly 10 into bearing contact with the regenerative rotor 1. In this way, a plurality of such sealing assemblies seal high-pressure air and low-pressure gas streams separately and also support the rotor 1 slidably within the housing.

Since the sliding pad 11 is retained by the backing 13 in accordance with this invention, the solid lubricant forming the pad requires less physical strengths than an unbacked seal element made entirely of the solid lubricant. This permits the use of a material with better lubrication properties, and hence a less torque requirement for driving the regenerative rotor 1 and longer life of the rotor.

Moreover, because the seal assembly 10 is reduced in overall thickness while maintaining the necessary strengths, its rigidity can be decreased. The assembly, therefore, can achieve improved sealing performance by freely following the variations in the end face configurations of the regenerative rotor 1 that arise from factors such as disturbances, thermal or chemical strains of the rotor itself, and inadequate machining accuracy. Good sealability is maintained even if the pressure with which the seal assembly 10 is held in bearing contact with the regenerative rotor 1 is decreased. This results in a reduced driving torque requirement for the rotor and prolonged service life of the sliding pad 11 due to a decreased PV value.

The backing 13 of thin sheet metal is easy to fabricate on a press, and it combines with the thin construction of the sliding pad 11 as a whole to save the cost and weight of the seal device. With this seal construction, it is easy to arrange solid lubricants optimumly in different parts of the sliding pad 11, depending on the temperature distribution therein that will result from the operation.

While the backing 13 of the embodiment being described holds the sliding pad 11 with the both crimped edges, the backing and the pad may instead be bonded together by a high-temperature adhesive.

As has been described hereinbefore, the present invention renders it possible, by stiffening the pad with a backing, to use a solid lubricant that provides a sliding pad of satisfactory sliding properties. In addition, the thin seal assembly permits attainment of improved sealability with reduced rigidity and also improved durability due to decreased pressure for bearing contact. Furthermore, the seal assembly of the invention is relatively simple in construction and easy to manufacture, thus making for marked reduction in seal cost.

Figure 4:
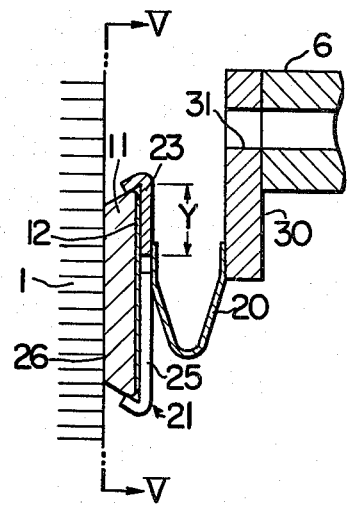
FIG. 4 is a sectional view of another embodiment of the invention.
Figure 5:
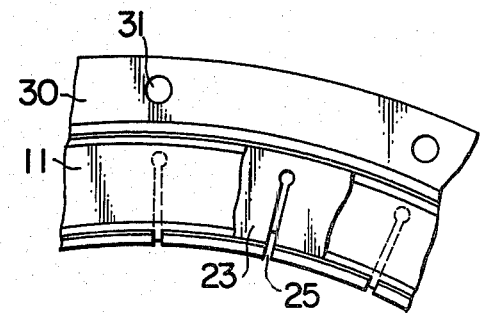
FIG. 5 is a fragmentary view as seen in the direction of arrows V—V in FIG. 4.

FIGS. 4 and 5 illustrate another embodiment of the invention, in which the parts like or similar to those already described in connection with FIG. 3 are given like numbers. The seal assembly 21 shown here includes a backing 23, which is formed with slits 25 at intervals of about 10 mm in the inner arcuate portion to reduce its rigidity to a degree barely sufficient to resist buckling due to the fluid pressure difference. The backing 23 has both edges thereof swaged or bent toward each other to hold the pad 11 with the gasket 12 positioned between the pad and the backing. However, without the gasket 12 positioned between the pad and the backing, the pad 11 and the backing 23 may be bonded together by a rubber-type high-temperature adhesive applied on their outer arcuate portions Y, and their inner peripheral portions are slidable relative to each other.

The seal assembly 21, which consists of the sliding pad 11 of a low elastic modulus and the backing 23 with slits 25, exhibits an extremely low rigidity. Therefore, it accommodates, without any distortion of the sliding surface 26, the spread of the edges of the semicircular portion 7b that can arise from the difference between the thermal expansion coefficients of the straight portion 7a and the semicircular portion 7b shown in FIG. 2. Thus, because the distortion of the sliding surface 26 can be avoided, the use of a wide sliding pad is made possible and, despite a reduction in the pressure for keeping the seal assembly 21 in bearing contact with the regenerative rotor 1, satisfactory sealing performance will be maintained. This enables the sliding pad 11 to attain improved durability with a reduced driving torque requirement for the regenerative rotor 1 and with a decreased PV value.

According to the present invention, as has been described hereinbefore, a sliding pad of a low elastic modulus is stiffened by a slitted backing, so that a solid lubricant with favorable sliding properties can be employed as the sliding pad. Also, because the seal assembly of low rigidity may be used, the difference in thermal expansion between the straight and semicircular seal portions can be accommodated without distorting the sliding surface of the pad. This permits the use of a wide sliding pad with increased durability.

What is claimed is:

1. A seal assembly for a rotary heat-exchanger of a gas turbine, said rotary heat-exchanger including a housing having therethrough a low pressure gas passage and a high pressure air passage, and a regenerative rotor rotatable within said housing across said passages to effect the heat exchange between gas flowing through said low pressure gas passage and air flowing through said high pressure air passage, said seal assembly being positioned between said housing and said regenerative rotor to seal between said passages and comprising:

a sliding pad of a solid lubricant having an inner and outer peripheries and opposite surfaces, one of said opposite surfaces being adapted to be in slidable contact with said regenerative rotor to support the same;

a backing of a thin sheet metal in flat contact with the other surface of said sliding pad and having an inner and outer peripheral edges respectively swaged over the inner and outer peripheral edges of said sliding pad to hold the same;

said thin sheet metal backing having formed therein with a plurality of spaced slits extending from the inner periphery toward the outer periphery of said thin sheet metal backing; and a resilient seal interposed between said sliding pad and said thin sheet metal backing.

2. A seal assembly defined in claim 1, wherein said resilient seal comprises an adhesive layer extending over at most the outer peripheral region extending from the outer periphery of said thin sheet metal backing to the outer ends of said slits therein.

3. A seal assembly defined in claim 1, wherein said resilient seal comprises a gasket.

4. A seal assembly defined in claim 2 or 3, wherein said thin sheet metal backing has its thickness of approximately 0.5 mm.

5. A seal assembly defined in claim 4, wherein said plurality of slits are equi-distantly spaced from each other approximately 10 mm.

6. A seal assembly defined in claim 5, wherein said sliding pad includes a portion of a ceramic-type solid lubricant which is exposed to the gas and a portion of a carbon-type solid lubricant which is exposed to the air.

7. A seal device for a rotary heat-exchanger of a gas turbine, said rotary heat-exchanger including a housing having therethrough a low pressure gas passage and a high pressure air passage, and a regenerative rotor rotatable within said housing across said passages to effect the heat exchange between gas flowing through said low pressure gas passage and air flowing through said high pressure air passage, said seal device being positioned between said housing and said regenerative rotor to seal between said passages and comprising a seal assembly and resilient means for urging said seal assembly against said regenerative rotor, said seal assembly including:

a sliding pad of a solid lubricant having an inner and outer peripheries and opposite surfaces, one of said opposite surfaces being adapted to be in slidable contact with said regenerative rotor to support the same;

a backing of a thin sheet metal in flat contact with the other surface of said sliding pad and having an inner and outer peripheral edges respectively swaged over the inner and outer peripheral edges of said sliding pad to hold the same;

said thin sheet metal backing having formed therein with a plurality of spaced slits extending from the inner periphery toward the outer periphery of said backing; and a resilient seal interposed between said sliding pad and said thin sheet metal backing;

wherein said resilient means is disposed between said thin sheet metal backing and said housing to resiliently urge said thin sheet metal backing toward said regenerative rotor to urge said sliding pad thereagainst.

8. A seal device defined in claim 7, wherein said resilient seal comprises an adhesive layer extending over at most the outer peripheral region extending from the outer periphery of said thin sheet metal backing to the outer ends of said slits therein.

9. A seal device defined in claim 7, wherein said resilient seal comprises a gasket.

10. A seal device defined in claim 8 or 9, wherein said thin sheet metal backing has its thickness of approximately 0.5 mm.

11. A seal device defined in claim 10, wherein said plurality of slits are equi-distantly spaced from each other approximately 10 mm.

12. A seal device defined in claim 11, wherein said sliding pad includes a portion of a ceramic-type solid lubricant which is exposed to the gas and a portion of a carbon-type solid lubricant which is exposed to the air.

* * * * *